Dec. 15, 1936. F. A. WHITELEY Re. 20,208

DEVICE FOR CONDITIONING AIR

Original Filed Sept. 11, 1931 2 Sheets-Sheet 1

Inventor:
F. A. Whiteley.
By Whiteley and Ruckman
Attorneys.

Dec. 15, 1936. F. A. WHITELEY Re. 20,208

DEVICE FOR CONDITIONING AIR

Original Filed Sept. 11, 1931 2 Sheets-Sheet 2

Inventor
F. A. Whiteley
By Whiteley and Buckman
Attorneys

Reissued Dec. 15, 1936

Re. 20,208

UNITED STATES PATENT OFFICE 20,208

DEVICE FOR CONDITIONING AIR

Frank A. Whiteley, Covington, Ky.

Original No. 2,021,583, dated November 19, 1935, Serial No. 562,249, September 11, 1931. Application for reissue October 31, 1936, Serial No. 108,686

13 Claims. (Cl. 257—8)

This invention relates to a device for conditioning air and has for one object the provision of a simple but efficient apparatus so formed as to be operative to maintain air within an enclosure at desired temperatures and conditions during all seasons of the year.

This invention, contemplates the provision of an air-conditioning apparatus, which, in operation, is connected with both heating and cooling means, so that, as desired, warm air in a proper state of humidification or cooled relatively dry air may be supplied to the interior of an enclosure.

Another object of this invention is the provision of a casing which may be arranged within an enclosure to be air-conditioned or arranged in a wall of the enclosure, said casing having openings adjacent the upper and lower portions thereof which communicate with the space to be conditioned and said casing further having means therein for temperature conditioning air and means for forcing the air therethrough so that it is discharged through one or the other of said openings as desired.

Still another object of the invention is the provision of an air-conditioning device or apparatus embodying a casing for arrangement within an enclosure, the casing having openings at separated points adjacent the ends thereof and having air-conditioning equipment therein and means for effecting passage of air through the casing in either of two directions so that conditioned air may be discharged from the casing either adjacent one or the other of the end portions thereof.

A further object of the invention is the provision of a device for temperature conditioning air comprising a casing having openings arranged in opposite end portions thereof but in communication, respectively, with the roof or ceiling zone and the lower or floor zone of the space to be conditioned, with means in the casing for causing passage of air therethrough to be discharged into the enclosure either adjacent the upper or lower zone thereof as desired; the casing further having means therein for heating and cooling the air during its passage therethrough.

It is a further object of my invention to provide said casing, having such openings close to the floor and the ceiling respectively of the space wherein the air will be conditioned, with two sets of heat exchangers therein, and with means to cause one of said sets to give off heat, means to cause the other set to absorb heat, and means in the casing to move air in opposite directions in said casing for respective delivery through one of said openings of heated air or of cooled air.

It is a further object of my invention to provide an air-conditioning device for the purpose stated having upper and lower openings therein, together with means for alternatively circulating air to cause it to enter through the lower openings and discharge from the upper opening or to enter through the upper opening and discharge through the lower opening.

The full objects and advantages of my invention will appear in connection with the detailed description thereof, and the novel features of my inventive idea will be particularly pointed out in the claims.

In the drawings, illustrating an application of my invention in one form,—

Figure 1:
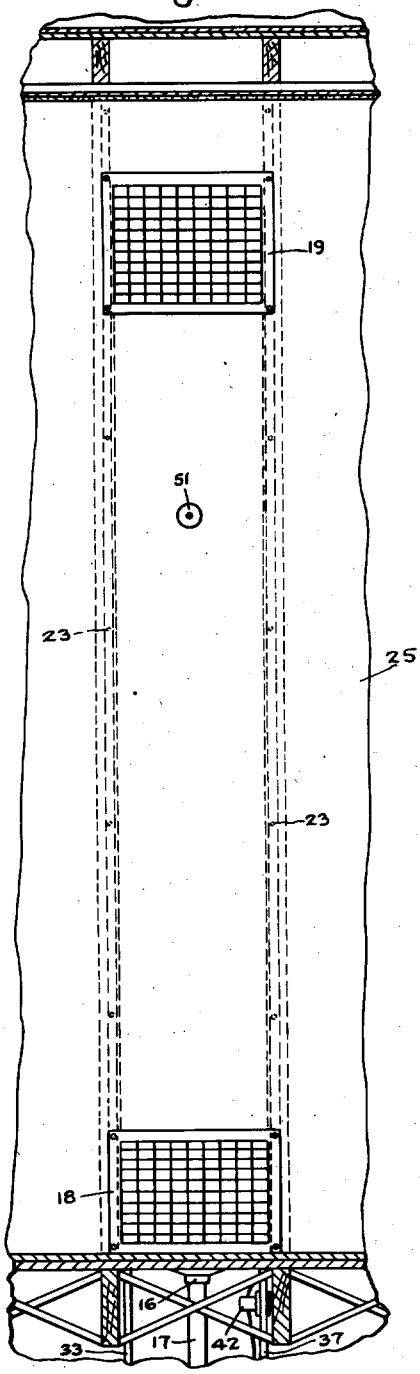
Fig. 1 is a front elevation view of my invention shown applied to a wall of an enclosed space with some structural parts of the enclosing walls in section, and the position of the air-conditioning member shown in part of dotted lines.
Figure 2:
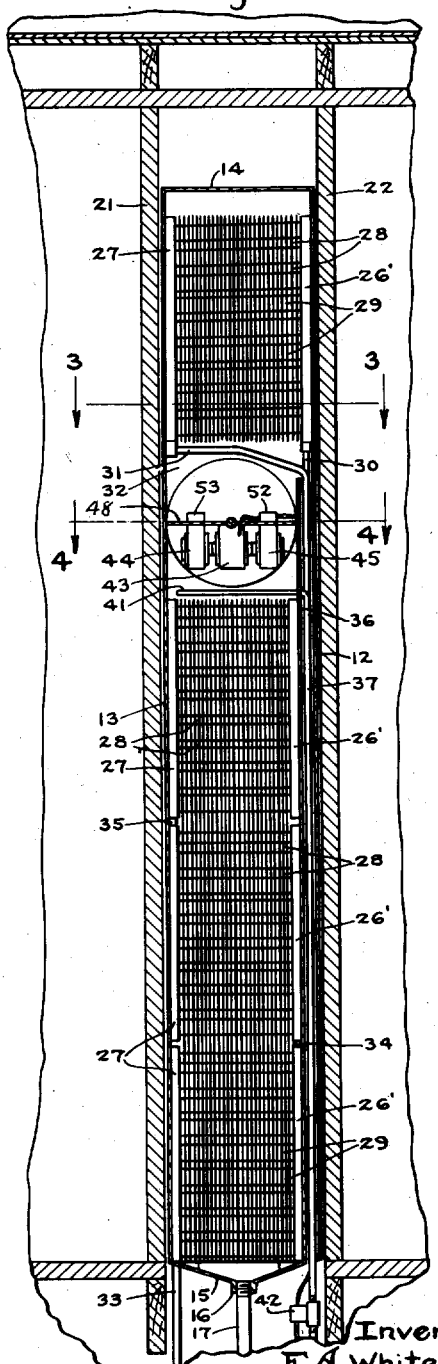
Fig. 2 is a sectional elevation view similar to Fig. 1.
Figure 3:
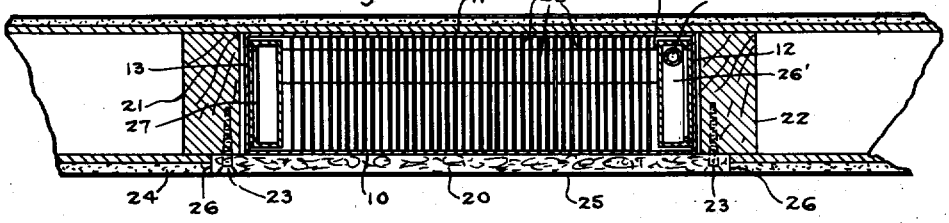
Fig. 3 is a sectional plan view on line 3—3 of Fig. 2, indicating the position of elements supporting the wall of the enclosed space.

My invention embodies a casing, preferably of sheet metal, having front and rear walls 10 and 11 and end walls 12 and 13, with a top wall 14 and a bottom wall 15, which last is in the form of a funnel with a connection for a drain pipe 17. The casing forms an elongated rectangular box closed except for top and bottom openings protected by lower register 18 and upper register 19. In the instance shown in the drawings, a room of a building is disclosed and the box or casing is arranged in the wall of the room and between studding; however, this is merely by way of an example, as the device may be arranged in any desired location within an enclosed space to be air-conditioned, the operation of said device being unchanged, and the term "room" as used in the specification and claims means any such enclosure or enclosed space to be air-conditioned. As illustrative of the use of the device, it will be apparent that it may be placed wherever desired, within a room of buildings or the passenger compartment of a railway car or motor vehicle or other public conveyance, or on or in the wall of a car or other vehicle employed for the transport of freight. The casing, as shown in Figs. 1 and 2, is positioned in such a manner that the lower register 18 is adjacent the floor and the upper register 19 is near the ceiling of the enclosed space or room. To the front 10 of this box is secured a plate 20 of suitable heat insulating material. The box is arranged between two members 21 and 22 forming a support in the wall, as shown two pieces of studding, and it is secured permanently in place by nails, screws or other fastening members indicated at 23 which may enter the members 21 and 22. As shown in the drawings, the face of the plate 20, when in position, may be even with the face of the wall 24, so that customary decorative means indicated at 25 may entirely conceal the joint 26 where the wall has been cut away or opened for the reception of the air-conditioning casing, or has been joined to said casing.

Figure 7:
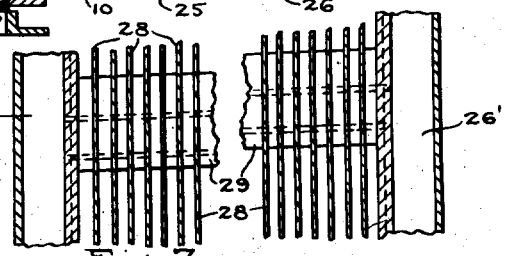
Fig. 7 is a side sectional view of a portion of one of the heat exchangers showing the oblique or downward trend of the tubes connecting the headers.

Within the casing above described are permanently positioned heat exchangers made, for example, in accordance with the process of my Patent No. 1,975,889, filed June 22, 1931 and issued October 9, 1934, and embodying headers 26′ and 27 of generally rectangular cross section, fin plates 28 and connecting tubes 29, the tubes being fused into the fin plates and integrated to the headers into which they open, in accordance with the principles of said process patent, excepting that in the present invention the tubes 29 do not extend between and at right angles to the headers 26′ and 27, but rather extend obliquely between said headers so that all of said tubes have a downward slant from the headers 26′ to the header 27, as clearly shown in Fig. 7.

One of said heat exchangers is shown in Fig. 2 positioned at the upper part of the casing and having an inlet hot water or steam pipe 30 connected with the bottom of header 26′ to an outlet steam or hot water pipe 31 connected with the bottom of header 27; these hot water or steam pipes being connected to a suitable source of heat (not shown), and located at a suitable point removed from the air-conditioner. Immediately below the upper heat exchanger is a blower chamber 32 which will be hereinafter described. Below said blower chamber is a group of three heat exchangers connected together in series in accordance with my aforesaid patent, with a pipe 33 for conveying a cooling or heat absorbing medium from compressor means, not shown, to the lower header 27 from which said medium goes to the lower header 26′ and from the lower header 26′ through connection 34 to the middle header 26′ and from there across to the middle header 27, and from the middle header 27 through connection 35 to the upper header 27; then from upper header 27 across to the upper header 26′ and through opening 36 and discharge pipe 37 back to the compressor. Steam or hot water pipes 30 and 31 and the discharge pipe 37 and water pipe 38 all pass downward through a chamber 39 formed by a partition 40 spaced from the end wall 12 of the casing, as clearly shown in Fig. 4.

The pipe 37 has a horizontal portion 41 overlying the fin plates 28 of the air-cooling heat exchanger. An automatic valve 42 controlled by a solenoid in circuit with the motor of the blowers hereinafter to be described, admits water to pipe 37 and its extension 41 when the blowers are in operation in heating air. After discharge from pipe portion 41, the water is delivered upon the fin plates 28 and flows downwardly along the surface of said fin plates. During the passage of air through the casing, it will be apparent that it will be washed by the water from pipe portion 41 and further will take up from the wet surfaces of the fin-plate humidifier sufficient water to be humidified.

Ordinarily it is necessary and desirable to humidify the air passing through the casing only when it is to be heated, and at such times the air in the casing which has been subjected to the humidifying action there, and before it contacts with the heating means, may become substantially saturated. But this saturated air will have become cooled by evaporation of water in the humidifier to a point well below room temperature. Hence, when it is heated and after it is discharged into the room, its relative humidity will drop so it will not over-humidify the room air at higher temperature in the space being air-conditioned, but ordinarily will supply just enough moisture to keep air at the higher room temperature just sufficiently and not too greatly humidified, and when over-humidification does tend to occur the supply of water to the humidifier may be cut off by well-known means. There may be times, however, when, owing to excessive dryness of the air, during severe cold spells, for example, it may be desirable to supply a greater amount of moisture to the air, and in such cases the blowers may be reversed, thus drawing the air from the heating heat exchangers, and driving hot air through the passages and over the wet surfaces of the plates in the cooling heat exchanger, thereby furnishing the requisite added moisture. And it is further desirable, in the summertime when the cooling heat exchanger is normally in operation, periodically to blow hot air over the cooling heat exchanger surfaces to dry them and prevent formation of slimes or other growths which might tend to clog these passages, and to keep the passages clean.

Figure 4:
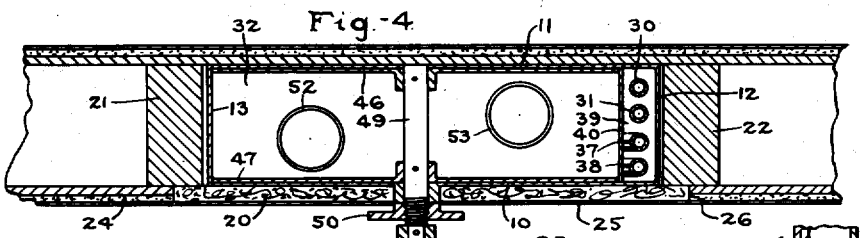
Fig. 4 is a similar sectional plan view taken on line 4—4 of Fig. 2.
Figure 5:
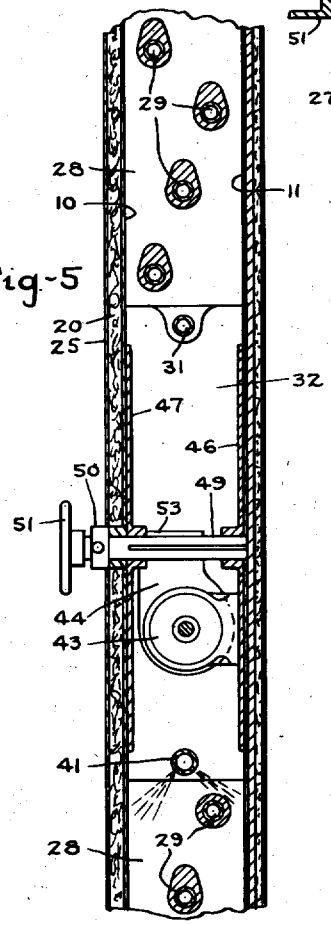
Fig. 5 is a sectional side elevation of the central portion of the air-conditioning device adjacent the blower mechanism.
Figure 6:
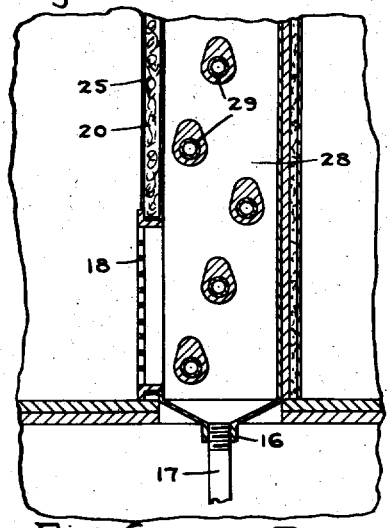
Fig. 6 is a similar view taken at the lower end of the air-conditioner and showing in section portions of what might be regarded as the floor of the enclosed space.

The air-moving arrangement comprises a motor 43 and centrifugal blowers 44, 45 at the sides of said motor, in the blower chamber 32. As best shown in Figs. 4 and 5, this blower arrangement is mounted within a rotatable drum having front and rear walls 46 and 47 and a transverse partition 48, all being secured upon a central shaft 49 held in the journal 50 at the side of the casing and adapted to be rotated by a handle 51. The discharge of the blowers 52 and 53 extends through the transverse partition 48, as best shown in Fig. 2.

The operation of the device as shown and described will be readily understood from the foregoing description. When in the position shown in Fig. 2 the blowers will draw air through lower register 18 and the casing below, which will pass through the fins of the cooling heat exchangers taking up moisture from the water films thereon and be driven through the fins 28 of the heating heat exchangers and discharge the air warm and moist through the upper register 19. When it is desired to use the device for cooling, the air-moving means may be rotated 180°, when air will be drawn in through the register 19, pass downwardly through the cooling heat exchangers and discharge through the lower register 18, being cooled on the way. The water which is condensed from this air on the cold fin plates 28 will gravitate to the bottom and discharge from the system through the pipe 12, and any excess water used in humidifying will find exit by the same means.

The advantages of my invention will be apparent from the foregoing description. The device is easily installed where steam or hot water heating appliances are available. When the same has been installed it will be substantially invisible, except at the register openings at top and bottom. It will operate to deliver warm moist air in winter or cold weather, at the top, taking into the system the cold air at the bottom, and in summer or in hot weather, it may operate to deliver cold dry air at the bottom and take in the hot humid air at the top. It is cheap to construct, and hence where used in dwellings will be within the means of the ordinary householder.

One advantage of such use of this construction is that in dwelling houses an air-conditioner may be placed in each of several rooms, as a living room and a bedroom, and be connected to compresser mechanism in the basement by separate leads so that a compressor need be employed only large enough to operate one heat exchanger but may be connected alternatively to either the living room heat exchanger or the bedroom heat exchanger to cool the one in the day time and the other at night. A further advantage of the air-conditioner resides in its use in conditioning the air in offices or large office buildings or in the rooms of apartments in apartment buildings or in the spaces within separate railway cars. Separate air-conditioners embodying the principles of my invention may be applied to each office or each group of offices, or each room or apartment, or each car, and the heating unit supplied with steam from the usual remote source and the cooling unit supplied with a cooling medium from a central compressor condenser unit or the like in a manner similar to the distributing of heating medium from a central heating unit.

The invention as described recites the discharge of heated conditioned air into an enclosure adjacent the ceiling or roof zone, and the discharge of cooled conditioned air into the enclosure adjacent the lower portion or floor, but it is to be understood that this is for illustrative purposes only as it is obvious, depending upon the position of the blowers 44 and 45 heated or cooled air may be discharged into the enclosure either adjacent the roof or ceiling zone, or adjacent the floor, as desired. In view of this, it is to be understood, that various changes may be made within the spirit of the invention without departing from the scope of the appended claims. The invention comprises a unit construction capable of installation within an enclosure or space to be air-conditioned, such as a room in a dwelling or other building or a railway passenger car or other public conveyance or freight-carrying conveyance, and may be of a form adapted for arrangement in the wall of a building between studding or in the wall of other enclosures whereby to be substantially invisible; the apparatus having air-conditioning equipment therein adapted to receive heating and cooling mediums and being provided with means so formed and arranged as to be capable of causing passage of air through the casing in either of two directions as desired, so that conditioned air will be discharged into the enclosure and space to be air-conditioned either adjacent the roof or ceiling thereof or adjacent the floor.

I claim:

1. An air-conditioner, comprising a casing adapted to be positioned in the wall of a room between studding and having top and bottom openings, means in said casing for heating air, means in said casing for cooling air, and means in the casing for moving air adjustably to cause the air to enter the casing at the bottom and discharge from the top when the heating means is in operation, and to enter the casing at the top and discharge from the bottom when the cooling means is in operation.

2. An air-conditioner comprising a casing having upper and lower openings, means at the top of the casing for heating air, means at the bottom of the casing for cooling air, a blower between said means, and means for positioning the blower to discharge air upwardly through said heating means and out of the upper opening or downwardly through said cooling means and out of the lower openings.

3. An air-conditioner comprising a casing adapted to be positioned in the wall of the room between studding and having top and bottom openings, means in said casing for heating air, means in said casing for cooling air, and means in the casing for moving air through said cooling means and said heating means, and means associated with the cooling means for humidifying the air as it is moved therethrough when the heating means is operative to heat the air.

4. An air-conditioner comprising an elongated vertical casing having openings close to the floor and to the ceiling respectively of a room, two sets of heat exchangers therein, means to cause one of said sets to give off heat, means to cause the other set to absorb heat, and means in the casing to move air in opposite directions in said casing for respective delivery through one of said openings of heated air or cooled air.

5. An air-conditioner comprising an elongated casing, two sets of heat exchangers therein, each embodying a multiplicity of vertical fin plates, means to cause one of said sets to give off heat, means to cause the other set to absorb heat, and means to wet the surfaces of the cooling fins when the heating fins are in operation.

6. An air-conditioner comprising a casing having contiguous spaced parallel vertical walls, a rotatable table therein between said walls, a blower mounted on said table for moving air through the casing, means to rotate the table in planes parallel to said walls to reverse the direction of movement of the air, and means in the casing for conditioning the air as it is moved.

7. An air-conditioner comprising a casing having contiguous spaced parallel vertical walls, a rotatable table in the casing embodying spaced plates substantially engaging said walls and a transverse partition, a blower located between the plates on one side of the partition and discharging on the other side, means to rotate the table to reverse the direction of said discharge, and means in the casing for conditioning the air moved by the blower.

8. An air-conditioner, comprising a casing forming a vertical elongated duct adapted to be positioned in the wall of a room between studding and having top and bottom openings near the ceiling and floor, respectively, means in said casing for heating air, means in said casing for cooling air, and a blower in said casing adjustable to cause the air to move through the casing and enter and discharge from the openings in one direction when the heating means is in operation and to move through the casing and enter and discharge from the openings in an opposite direction when the cooling means is in operation.

9. An air-conditioner, comprising an elongated casing having top and bottom openings, a heating heat exchanger and a cooling heat exchanger in said casing, means to cause water to flow down over the exposed surfaces of the cooling heat exchanger to make it serve as a humidifier when the heating heat exchanger is operative, and means located above the cooling heat exchanger to move the air.

10. An air-conditioner, comprising a casing having openings at the ends, cooling and heating heat exchangers in said casing, means to cause water to flow over the exposed surfaces of the cooling heat exchanger to make it serve as a humidifier when the heating heat exchanger is operative, and means between the heat exchangers to move the air.

11. An air-conditioner, comprising an elongated casing having openings at or near its ends, a heating heat exchanger located towards one end thereof, a cooling heat exchanger located towards the other end and having a wall thereof spaced from a wall of the casing, and inlet and outlet pipes for the heating heat exchangers entering the casing at said last-named end and extending along in the space between said walls.

12. An air-conditioner, comprising an elongated casing, means in the casing for heating air, a multiplicity of spaced plates forming a corresponding number of parallel passageways extending within the casing, means to move the air to be subject to said heating means and to pass through said passageways, and means to wet the surfaces of said plates while said air is moved.

13. An air-conditioner, comprising a casing forming a vertical elongated duct having upper and lower openings, a blower mounted wholly within the casing having an air outlet extending longitudinally of said duct to move the air therethrough, means to shift the position of the blower to direct movement of the air either up or down in said casing to discharge either through the upper or lower openings thereinto, and means in the casing for conditioning the air as it is moved.

FRANK A. WHITELEY.